United States Patent Office 2,993,906
Patented July 25, 1961

2,993,906
PURIFICATION OF IMIDAZOLIDONES
Gerhard E. Sprenger and Hans W. Albrecht, Providence, R.I., assignors to Metro-Atlantic Inc., Centerdale, R.I., a corporation of Rhode Island
No Drawing. Filed Mar. 10, 1958, Ser. No. 720,058
3 Claims. (Cl. 260—309.7)

The present invention relates to the purification of imidazolidones and particularly to the purification of 2-imidazolidones.

Although not limited thereto, the present invention will be particularly described in its application to the purification of the imidazolidones of the following general formula:

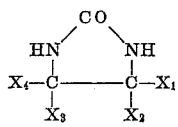

where $X_1$, $X_2$, $X_3$, and $X_4$ may be hydrogen or $CH_3$— groups.

The above imidazolidones are generally of the class of cyclic ureas, the most simple of which is ethylene urea of the formula:

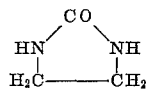

These ethylene urea products generally are not purified but are directly employed for immediate conversion into derivatives. For example, by reaction with aqueous formaldehyde, the resultant dimethylol ethylene urea may be utilized for treatment of cellulosic textile fibers to give them dimensional stability.

Crude ethylene urea as produced generally is colored and has an initial aminic odor, which after storage reverts into an objectionable strong ammoniacal odor.

Furthermore, these crude ethylene ureas do not form clear solutions in water but give turbid solutions, which are not neutral but distinctly alkaline in reaction.

It is among the objects of the present invention to prepare at low cost and with high yield a pure cyclic urea or ethylene urea, which will be substantially devoid of impurities as for instance devoid of impurities causing an aminic odor or a subsequent development of an ammoniacal odor.

Another object is to produce a purer ethylene urea which will form a white and odorless crystalline solid, which will be completely soluble in water to give a clear solution of neutral reaction, and which will be substantially devoid of either water soluble or water insoluble impurities.

Although it is possible to purify crude cyclic ureas, and particularly ethylene urea, in several steps to remove water insoluble and then water soluble impurities, as for example by separation through filtration and recrystallization, with or without filter aids, such as Filtercel or charcoal, nevertheless these processes involve considerable time and cost.

It is, therefore, among the further objects of the present invention to provide a method of purifying crude ethylene urea in substantially one step without reworking operations or without repeated recrystallizations to remove both water soluble, as well as water insoluble, impurities and particularly the alkalizing impurities therein.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable to subject an aqueous solution of crude ethylene urea to contact with an ion-exchange resin of the cation exchanging kind in its acid-, or hydrogen ion containing form.

The preferred cation exchange resins for purification are cationic exchange modified poly-styrene sulfonic acid resins, which are, for example, commercially available under the trade name Dowex–50 made by The Dow Chemical Company of Midland, Michigan.

The following examples will illustrate the method of purifying crude ethylene urea.

Example I

The crude ethylene urea was made by reacting ethylene diamine and urea.

The crude ethylene urea was then dissolved in water to make up a 40% solution. A part of this solution was filtered and a part was left unfiltered. Then the filter solution and the unfiltered solution separately were stirred for three hours at 75° to 80° C. in the presence of 2% or 2 parts by weight of the exchange resin per hundred parts of the solution.

After this treatment with the exchange resin the solutions were cooled to 25° C. and the base exchange resin was removed.

The following is a comparison of the treated and untreated solutions with or without filtration:

| | Untreated | | Resin Treated | |
|---|---|---|---|---|
| Solution | Unfiltered | Filtered | Unfiltered | Filtered. |
| Appearance | turbid | clear | clear | clear. |
| Color | | 40/40 APHA. | 0/10 APHA. | 0/10 APHA. |
| pH | 11.1 | 11.1 | 7.5 | 7.5. |
| Alkalinity (mg. KOH/gm.) (titration with HCl and Methyl orange indicator). | 4.0 | 3.5 | 0.0 | 0.0. |
| Specific gravity (25° C.). | 1.098 | 1.098 | 1.097 | 1.097. |

The abbreviation APHA stands for American Public Health Association standards.

Example II 100 grams each of the untreated and the treated clear filtered solutions of Example I are concentrated, by distilling off the water solvent, first at atmospheric and later at gradually reduced pressures down to 25 mm. Hg and at temperatures not exceeding 135° C.

In both cases, a clear melt is obtained which, on cooling, solidifies to an opaque, crystalline mass.

Each mass was ground to a fine powder and air dried at 50° C. for 16 hours.

The dried materials obtained have the following characteristics:

| | Solids from— | |
|---|---|---|
| | Untreated solution | Resin treated solution |
| Melting Point (° C.) | 128 | 130. |
| Color | Off White | White. |
| Odor | Ammonia | None. |
| Alkalinity (mg. KOH/g.) | 4.2 | 0.0. |
| pH (40% aqueous Sol'n) | 10.0 | 7.5. |
| Appearance (40% aqueous Sol'n) | turbid | clear. |
| Color (40% aqueous Sol'n) | 40/50 APHA | 0/10 APHA. |

In spite of the filtration and drying the untreated product still had ammoniacal odor and alkalinity.

The treatment of these solutions with the cation-exchange resin not only removes all or part of the alkaline impurities, but surprisingly upon further processing and upon reduction to a crystalline mass will produce a completely water soluble product, as contrasted to the incompletely soluble products which are produced when the cation-exchange treatment is not employed.

It is not to be predicted from the knowledge of the action of these cation-exchange resins that they would achieve both odor and color removal as well as an altogether water soluble crystalline product, which previously had been prevented from forming by the ingredients removed by the cation-exchange resin. This process produces purified ethylene urea at very low cost in completely water soluble, non-odorous and neutral form, which previously was only obtainable at high cost through recrystallization.

As a result of the present process, pure ethylene urea may be produced at a cost which will permit the crystalline product to be utilized for the manufacture of derivatives and so that dimethylol ethylene urea may be produced directly in a textile mill by reacting pure ethylene urea with the aqueous formaldehyde, without also conducting a process of manufacturing of ethylene urea from ethylene diamine and urea.

Although this invention has been particularly described in its application to ethylene urea, it may also be employed as applied to other imidazolidones, as for example 4-methyl, 2-imidazolidones of the formula

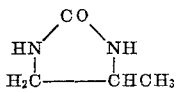

obtained from the interaction of propylene diamine and urea.

The cation-exchange resin may either be used continuously or by the batch process, and the amount of ion-exchange resin required for purification is proportional to the amount of alkalinity in the crude product, and not to the amount of crude ethylene urea.

Where a continuous or column process is employed the exchange resin is repeatedly regenerated and re-used.

Furthermore in the batch process several vessels may be employed, through which the solution to be purified is passed in countercurrent.

The concentration of the crude ethylene urea solution should be maintained within the range of 40% to 70%, with the temperature being maintained within the range of 25° to 90° C. and with the time of treatment being maintained within the range of ½ to 4 hours, and preferably not longer than 2 hours.

After the treatment of the solution with the cation-exchange resin, the solution may be subjected to distilling and evaporation procedures, with or without use of reduced pressure or vacuum.

Desirably the concentration and removal of water should take place as fast as possible, especially if elevated temperatures above 135° C. are used.

Although the concentration may be readily continued to complete dryness, generally it is found sufficient to reduce the water so that the pure ethylene urea will crystallize with one mol weight of water for two mols of ethylene urea.

Where methyl ethylene urea is prepared, there will be no crystallization with water and the concentration may be continued until the pure product is produced.

The purified cyclic ureas are non-odorous, colorless, non-alkaline, and completely water soluble, and they may be merchandised in the form of an aqueous solution or as a substantially dry solid.

When dry they may either contain water of crystallization and may be prepared in granular, powdered, pelleted or pill form.

Instead of vacuum drying, it is also possible to use spray drying or drum drying preferably below 130° C. to obtain the crystalline water-soluble ethylene urea from the filtered resin treated 40% solution.

Although it is preferred either to mix the cationic active resin with the 40% solution of the crude filtered ethylene urea it is also possible to pass the crude solution of ethylene urea in a 40% concentration or concentrations ranging from 20% to 50% through a column containing the cation exchange resin.

Similarly, where desired a mixture of cation exchange resins and an anion exchange resin may be employed and used for the treatment of a neutralized filtered crude ethylene urea solution.

It has been found that the final ethylene urea solution after treatment with the resin will carry with it small quantities of the ion exchange resin which greatly enhances the property of the ethylene urea, particularly where it is used in a rocket fuel, as a base material for preparing a textile bleach, and for treatment of textile fabrics to give them dimensional stability.

The preferred resins for ion exchange are styrene resins which have cross-linkages and which possess sulfo-groups in acid form.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A process of purifying crude ethylene urea which comprises dissolving it in water to make a 40% solution stirring it for three hours at 75 to 80° C. in the presence of 2 parts by weight of a polystyrene sulphonic acid cation active base exchange resin, cooling to 25° C. and removing the base exchange resin to produce a clear solution of ethylene urea of substantially neutral pH and removing the water.

2. The process of claim 1 in which the water is distilled off at a gradually reduced pressure down to 25 mm. mercury Hg and at a temperature not exceeding 135° C. to obtain a clear melt cooling to form an opaque crystalline mass and then air drying at 50° C. for 16 hours and the resultant product being fully water soluble.

3. A process of treating crude ethylene urea to purify the same which comprises treating a 40 to 70% by weight aqueous solution of the ethylene urea at a temperature of 25 to 90° C. for ½ to 4 hours with a polystyrene sulphonic acid cation active base exchange resin and then removing the water to obtain a purified ethylene urea.

References Cited in the file of this patent

Calmon and Kressman: Ion Exchangers in Organic and Biochemistry, Interscience Publishers, Inc., N.Y., N.Y., February 1957, pp. 219, 271, 347, and 352.